United States Patent
Oomori (10) Patent No.: US 7,193,745 B2
(45) Date of Patent: Mar. 20, 2007

(54) IMAGE PROCESSING APPARATUS AND IMAGE TRANSMITTING APPARATUS

(75) Inventor: Akira Oomori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 838 days.

(21) Appl. No.: 09/877,047

(22) Filed: Jun. 11, 2001

(65) Prior Publication Data

US 2001/0052991 A1 Dec. 20, 2001

(30) Foreign Application Priority Data

Jun. 12, 2000 (JP) .............................. 2000-175764

(51) Int. Cl.
B41J 1/00 (2006.01)
(52) U.S. Cl. ....................... 358/1.9; 358/2.1; 358/1.13; 358/1.15
(58) Field of Classification Search ................. 358/1.9, 358/2.1, 1.13, 1.15, 434, 435, 436, 438, 439
See application file for complete search history.

(56) References Cited

U.S. PATENT DOCUMENTS

| 5,361,143 A | * | 11/1994 | Nakayama et al. ......... 358/500 |
| 5,392,131 A | * | 2/1995 | Umeno ........................ 358/403 |
| 5,392,133 A | * | 2/1995 | Nakajima ..................... 358/407 |
| 5,485,283 A | * | 1/1996 | Kaneko ....................... 358/518 |
| 5,537,231 A | | 7/1996 | Hisada et al. ............... 358/530 |
| 5,666,211 A | * | 9/1997 | Tahara et al. ............... 358/404 |
| 5,696,598 A | * | 12/1997 | Yoshida et al. ............. 358/434 |
| 5,719,686 A | * | 2/1998 | Sakamoto et al. .......... 358/444 |

FOREIGN PATENT DOCUMENTS

| JP | 03-245677 A | 11/1991 |
| JP | 05-048915 | 2/1993 |
| JP | 05-064020 A | 3/1993 |

* cited by examiner

Primary Examiner—Thomas D. Lee
(74) Attorney, Agent, or Firm—Fitzpatrick, Cella, Harper & Scinto (57) ABSTRACT

An image scanner scans and stores a document as a color image and a monochrome image when color mode is set. In accordance with specifications of a destination apparatus, an appropriate image is selected as between the stored color image and monochrome image, and the selected image is transmitted to the destination apparatus. The image scanner is thus capable of efficiently transmitting a scanned image to apparatuses having various specifications.

28 Claims, 9 Drawing Sheets

IMAGE PROCESSING APPARATUS AND IMAGE TRANSMITTING APPARATUS

BACKGROUND OF THE INVENTION

1. Field of the Invention

The present invention relates to image processing apparatuses and control methods therefor, image transmitting apparatuses and control methods therefor, and media for storing a program for controlling the same.

2. Description of the Related Art

Image scanners are known which perform functions for scanning a document in color mode or monochrome mode in accordance with an instruction from a user, storing the scanned image in a partitioned image storage region, and transmitting the scanned image stored in the image storage region to another apparatus. Transmission is performed in the form of e-mail data, facsimile data, or FTP (File Transfer Protocol) data. The destination apparatus includes an information processing apparatus such as a computer, a facsimile machine, a database, or the like.

When the color mode is designated at the time an image is scanned, a conventional image scanner scans a document as a color image and stores the color image in the image storage region. When the monochrome mode is designated, the image scanner scans the document as a monochrome image and stores the monochrome image in the image storage region.

An image scanner incapable of converting a color image into a monochrome image cannot transmit an image scanned in the color mode to a destination apparatus which is only capable of receiving monochrome images. When reading a document, it is necessary to select color mode or monochrome mode, at the time the image was scanned, in accordance with a function of a destination apparatus. When a read image is not suitable for the function of the destination apparatus, the image cannot be transmitted to the destination apparatus.

When transmitting an image scanned in the color mode to an apparatus which is only capable of receiving monochrome images, an image scanner capable of converting a color image into a monochrome image converts the image scanned in the color mode into a monochrome image in response to a transmission instruction. Subsequently, the image scanner transmits the monochrome image to the apparatus. It requires a long period of time to complete transmission from the time the transmission instruction is given.

SUMMARY OF THE INVENTION

Accordingly, it is an object of the present invention to provide an image processing apparatus capable of efficiently processing document image data.

It is another object of the present invention to provide an image transmitting apparatus capable of efficiently transmitting document image data to apparatuses having various specifications.

To this end, according to an aspect of the present invention, an image processing apparatus is provided including a mode setting unit for setting one of a first mode, in which color image data and monochrome image data are stored as document image data in a memory medium, and a second mode, in which the monochrome data is stored as the document image data in the memory medium. With this arrangement, it is possible to provide the image processing apparatus capable of efficiently processing document image data.

In accordance with another aspect of the present invention, an image transmitting apparatus is provided including a mode setting unit for setting one of a first mode, in which image data in a plurality of formats are stored as document image data in a memory medium, and from among the image data in the plurality of formats stored in the memory medium, image data suitable for a destination apparatus is transmitted to the destination apparatus, and a second mode, in which image data in a single format is stored as the document image data in the memory medium, and the image data in the single format stored in the memory medium is transmitted to the destination apparatus. With this arrangement, it is possible to provide the image transmitting apparatus capable of efficiently transmitting document image data to apparatuses having various specifications.

Further objects, features, and advantages of the present invention will become apparent from the following description of the preferred embodiments with reference to the attached drawings.

DESCRIPTION OF THE PREFERRED EMBODIMENTS

The present invention will become apparent from the following description of the preferred embodiments with reference to the accompanying drawings.

First Embodiment

Figure 1:
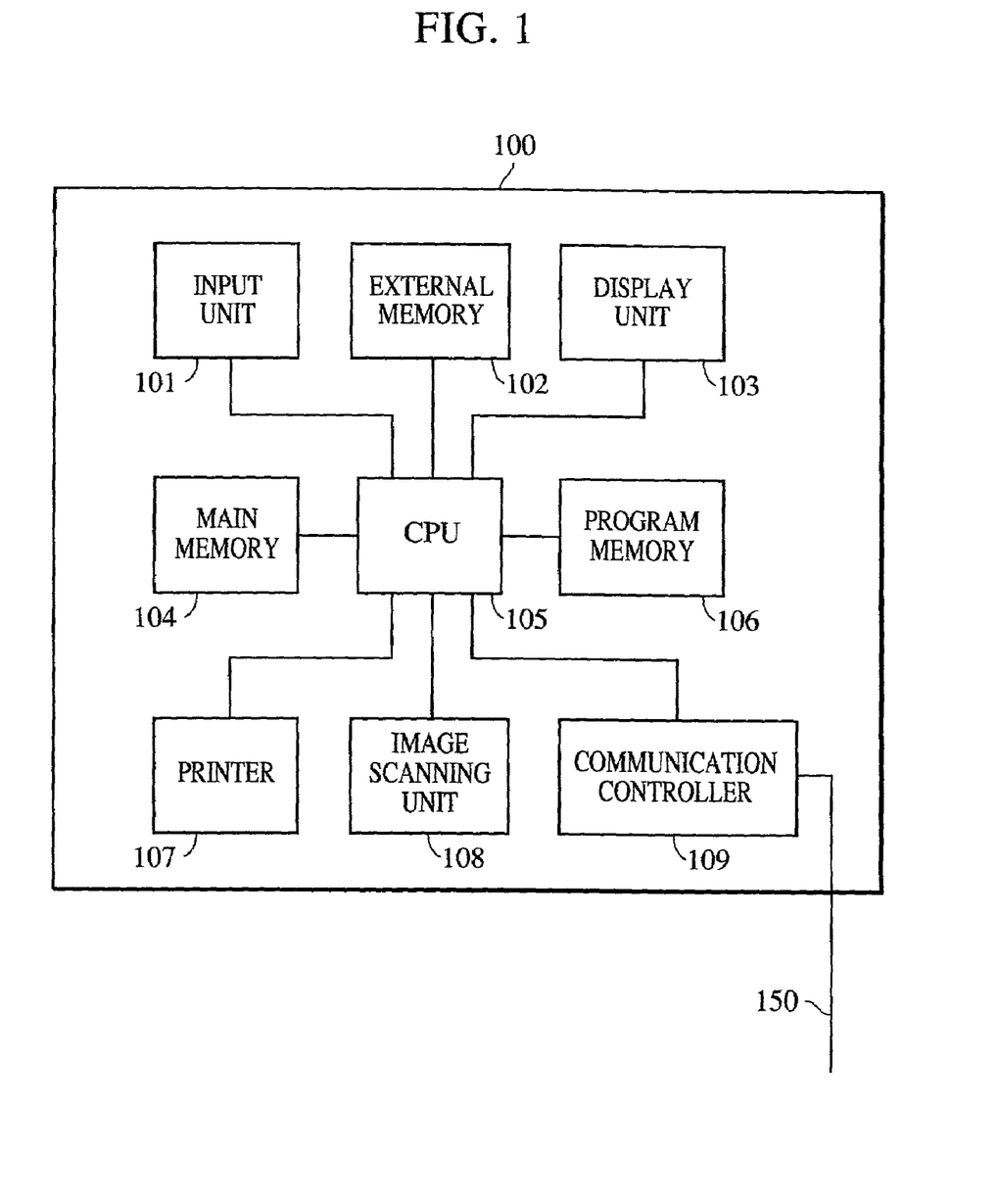
FIG. 1 is a block diagram of an image scanner according to a first embodiment of the present invention.

FIG. 1 shows the schematic structure of an image scanner according to a first embodiment of the present invention. An image scanner 100 includes an input unit 101, an external memory 102, a display unit 103, a main memory 104, a central processing unit (CPU) 105, a program memory 106, a printer 107, an image scanning unit 108, and a communication controller 109.

For example, the input unit 101 includes all or some of a keyboard, a touch panel, a button, a switch, and other input devices. In the first embodiment, it is assumed that the input unit 101 includes a touch panel and a keyboard, in order to simplify the description.

For example, the external memory 102 includes a magnetic recording device, a magneto-optical recording device, or the like. As long as the external memory 102 can store a large amount of data, any type of recording device can be used. For example, the external memory 102 can be a removable memory medium, such as a disk. Image data (such as scanned image data) generated by the image scanning unit 108 scanning an image is stored in the external memory 102.

The display unit 103 includes a display device (such as a liquid crystal display) for displaying various information. In the first embodiment, the display unit 103 and the input unit 101 form the touch panel. For example, the main memory 104 includes a dynamic random access memory (DRAM), a static random access memory (SRAM), or the like. The main memory 104 provides a work region for the CPU 1.

The CPU 105 controls the components 101 to 104 and 107 to 109 in accordance with a program stored in the program memory 106. The CPU 105 enables the image scanner 100 to operate as an apparatus with a new function. The program memory 106 includes, for example, a read only memory (ROM), such as a mask ROM, or a non-volatile memory (electrically erasable and programmable ROM (EEPROM), hard disk, or the like). The program can be stored in the program memory 106 at the time the program memory 106 is manufactured or shipped. Alternatively, the program can be supplied subsequent to shipping. For example, the program can be supplied to the program memory 106 through the communication controller 109. It is also possible to supply the program by distributing (e.g., selling) it stored in a disk or the like.

The printer 107 processes an image scanned by the image scanning unit 108 or processes an image received from another apparatus through the communication controller 109 and records the image on a recording medium, such as a recording sheet.

The image scanning unit 108 includes, for example, a light source and an opto-electrical transducer. A document is irradiated with light from the light source, and a document image is converted by the opto-electrical transducer into an electrical image signal. In the first embodiment, the image scanning unit 108 includes an auto-feeder for transferring a plurality of pages of a document one by one to a document scanning position, such as a predetermined position on a document holder.

The communication controller 109 is a controller for communicating with another apparatus through a communication line 150. For example, the communication line 150 includes a telephone line or an interconnection cable for a network such as a local area network (LAN). For example, the communication controller 109 can be a wireless communication unit or a unit for establishing a link with a wireless communication unit.

Figure 2:
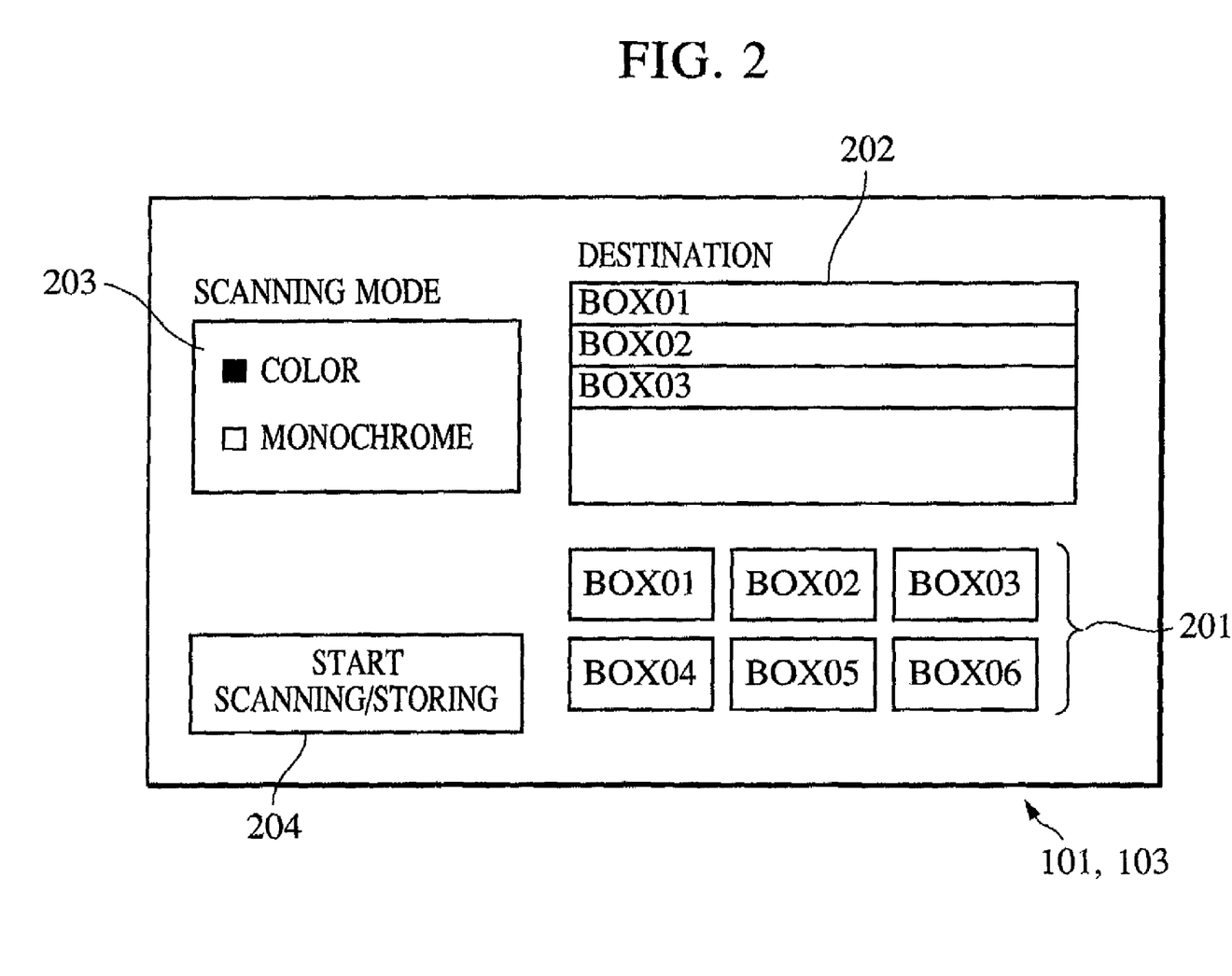
FIG. 2 illustrates an image storage screen displayed on a touch panel formed of an input unit and a display unit of the image scanner shown in FIG. 1 or FIG. 7.

FIG. 2 schematically illustrates an image storage screen displayed on the touch panel formed of the input unit 101 and the display unit 103 of the image scanner 100 shown in FIG. 1. By operating (touching) the screen, a user can designate a storage destination of a scanned image, designate a scanning mode, and instruct the image scanner 100 to start scanning and storing an image.

A storage-box selection button group 201 is a group of buttons for the user to select a storage destination from among a plurality of storage boxes (boxes 01 to 06). A storage box is a storage region obtained by logically or physically partitioning the external memory 102. In the example shown in FIG. 2, it is possible to select a storage box in which a scanned image is to be stored from among six storage boxes from box 01 to box 06.

A destination field 202 displays a storage box selected by operating the storage-box selection button group 201. In the example shown in FIG. 2, three storage boxes, from box 1 to box 3, are selected.

A scanning setting field 203 is used to enable the user to designate a scanning mode. Specifically, the user can select color mode or monochrome mode by pressing "color" or "monochrome", respectively, in the scanning setting field 203. The selected mode is indicated by, for example, displaying a corresponding rectangular box in black.

A scanning/storing start button 204 is used by the user to instruct the image scanner 100 to start scanning a document. When the scanning/storing start button 204 is pressed, the image scanner 100 uses the image scanning unit 108 to scan a document in a scanning mode designated in the scanning setting field 203 and stores the scanned image in a storage box designated in the destination field 202. Although the scanned image is managed textually in the first embodiment, this is only an example of a user interface. Alternatively, the scanned image can be managed graphically.

Figure 3:
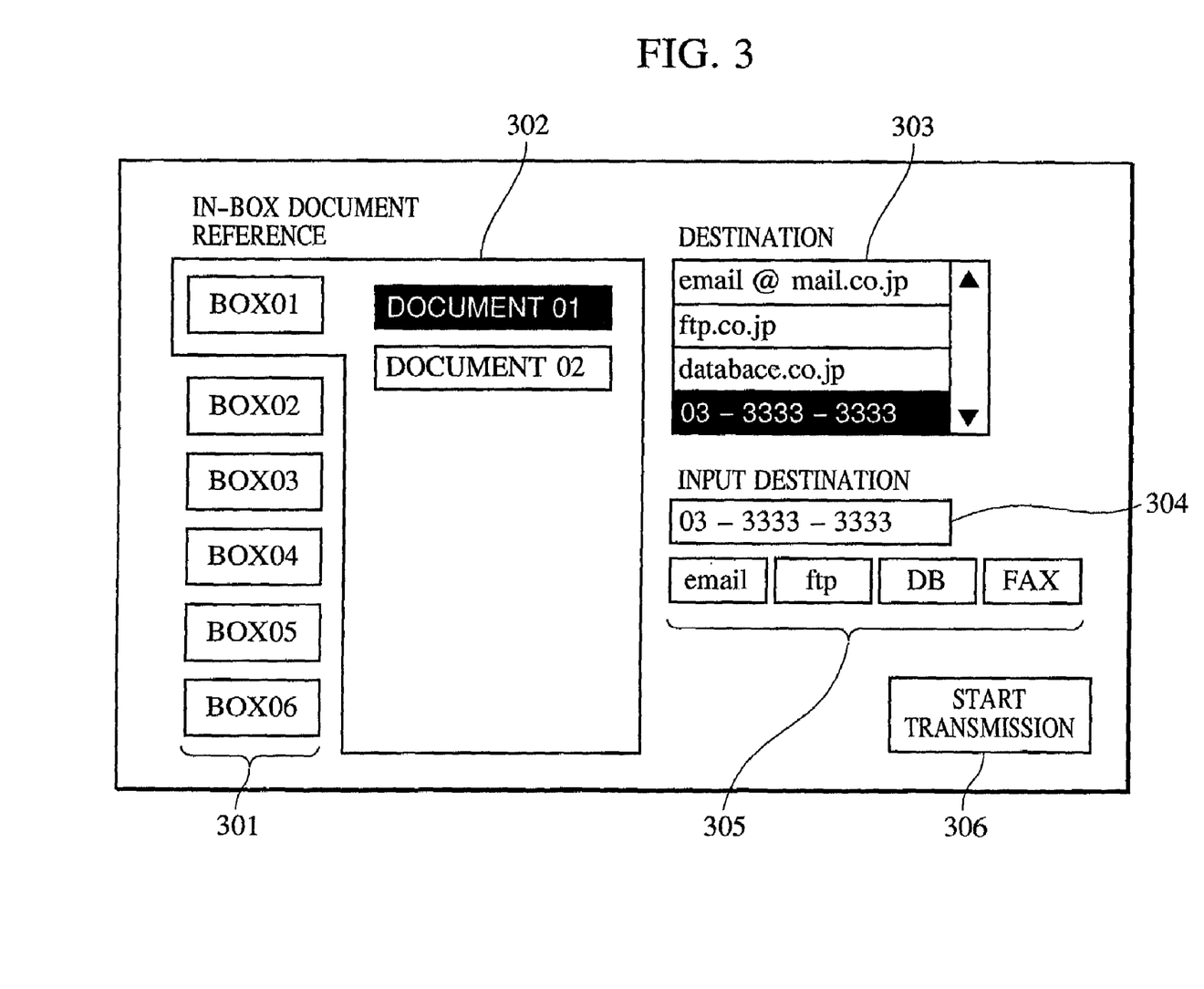
FIG. 3 illustrates a document transmission screen displayed on the touch panel formed of the input unit and the display unit of the image scanner shown in FIG. 1.

FIG. 3 shows a document transmission screen displayed on the touch panel formed of the input unit 101 and the display unit 103 of the image scanner 100 shown in FIG. 1. By operating (touching) the screen, the user can transmit a stored image to a designated apparatus.

When the user presses an arbitrary storage box in a storage-box reference button group 301, the storage box is selected. A document file name stored in the storage box is displayed in an in-box document reference field 302. In the example shown in FIG. 3, "document 01" and "document 02" are stored in the storage box "box 01". Instead of or in addition to the document file name, an image corresponding to the document file can be displayed.

When the user selects the document file name displayed in the in-box document reference field 302, the document file to be transmitted is selected or confirmed. The selected document file to be transmitted is highlighted in reverse video (for example, white characters are displayed on a black background).

In a transmission destination input field 304, the user uses the keyboard of the input unit 101 to input a destination. The inputting is confirmed by pressing any button in a destination type selection button group 305. The confirmed destination is registered in a transmission destination field 303. According to the image scanner 100 of the first embodiment, it is possible to designate a plurality of destinations and to simultaneously or continuously transmit a document file to the plurality of destinations.

When a transmission start button 306 is pressed after the destination has been selected, the selected document file ("document 01" in "box 01" in FIG. 3) is read from the external memory 102, and the read document file is transmitted to the selected destination (in the example shown in FIG. 3, the document file is faxed to "03-3333-3333").

Figure 4:
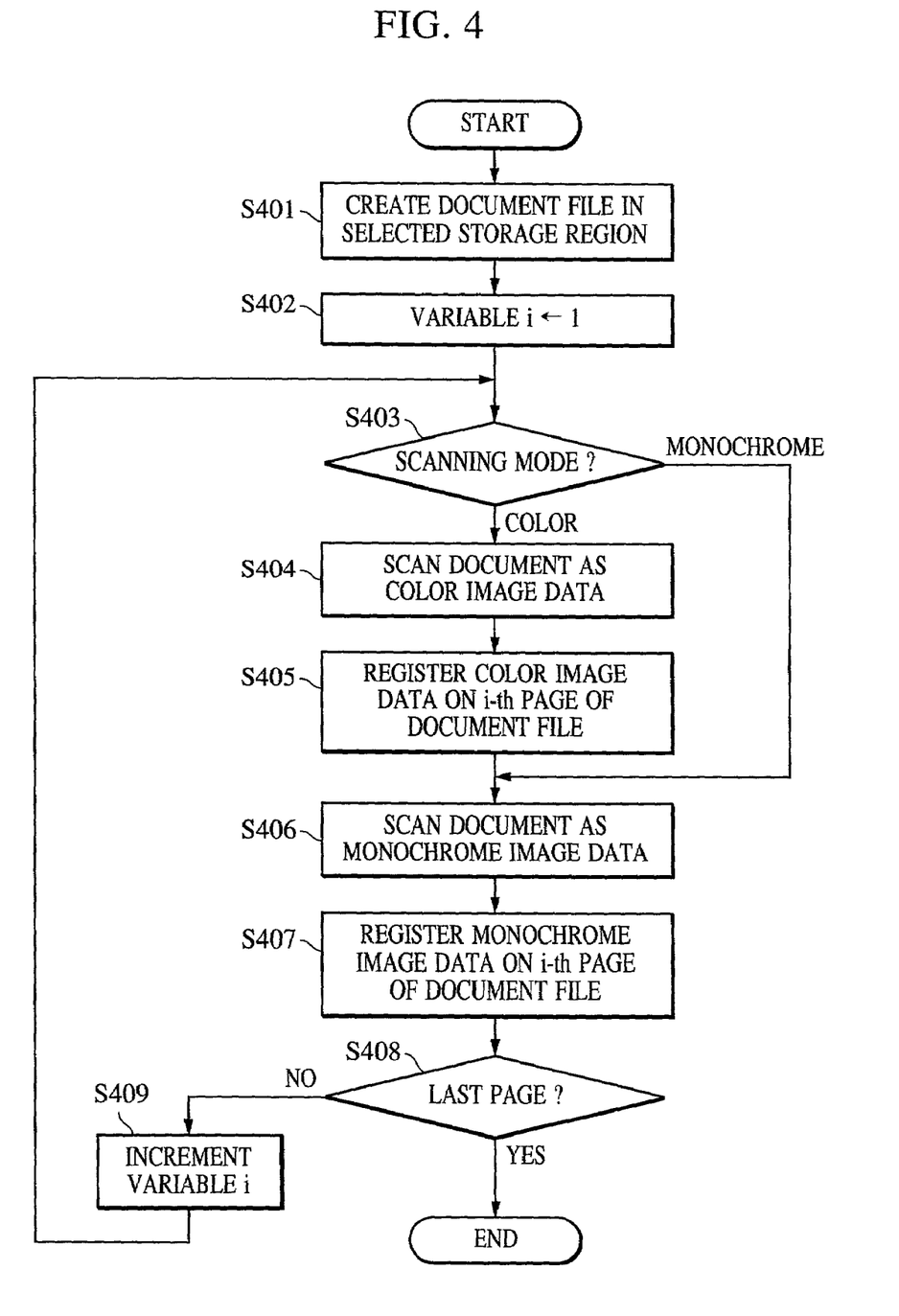
FIG. 4 is a flowchart showing a process of reading a document and storing the document in a storage box designated on the image storage screen shown in FIG. 2.
Figure 5:
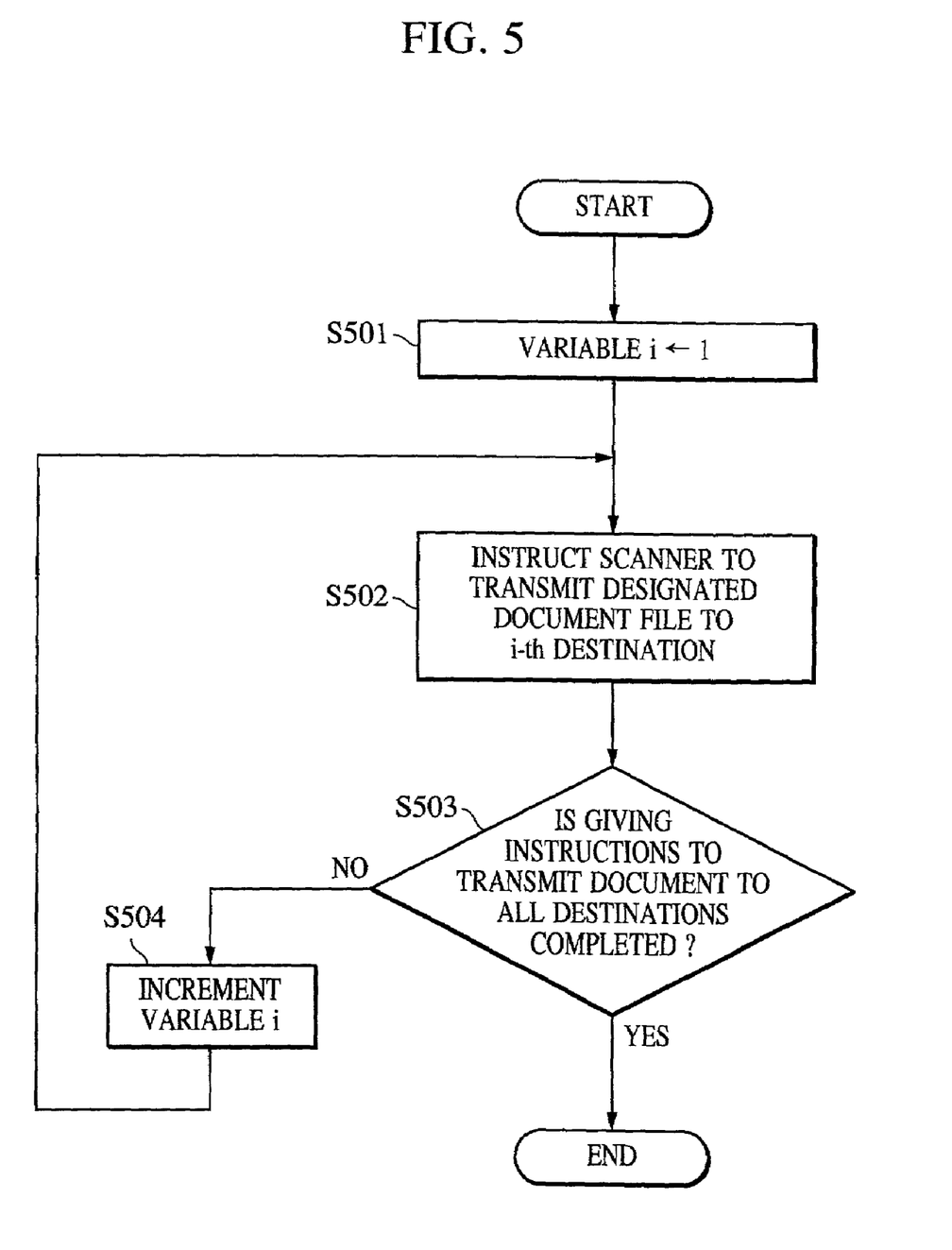
FIG. 5 is a flowchart showing a process of controlling transmission of a stored document file.
Figure 6:
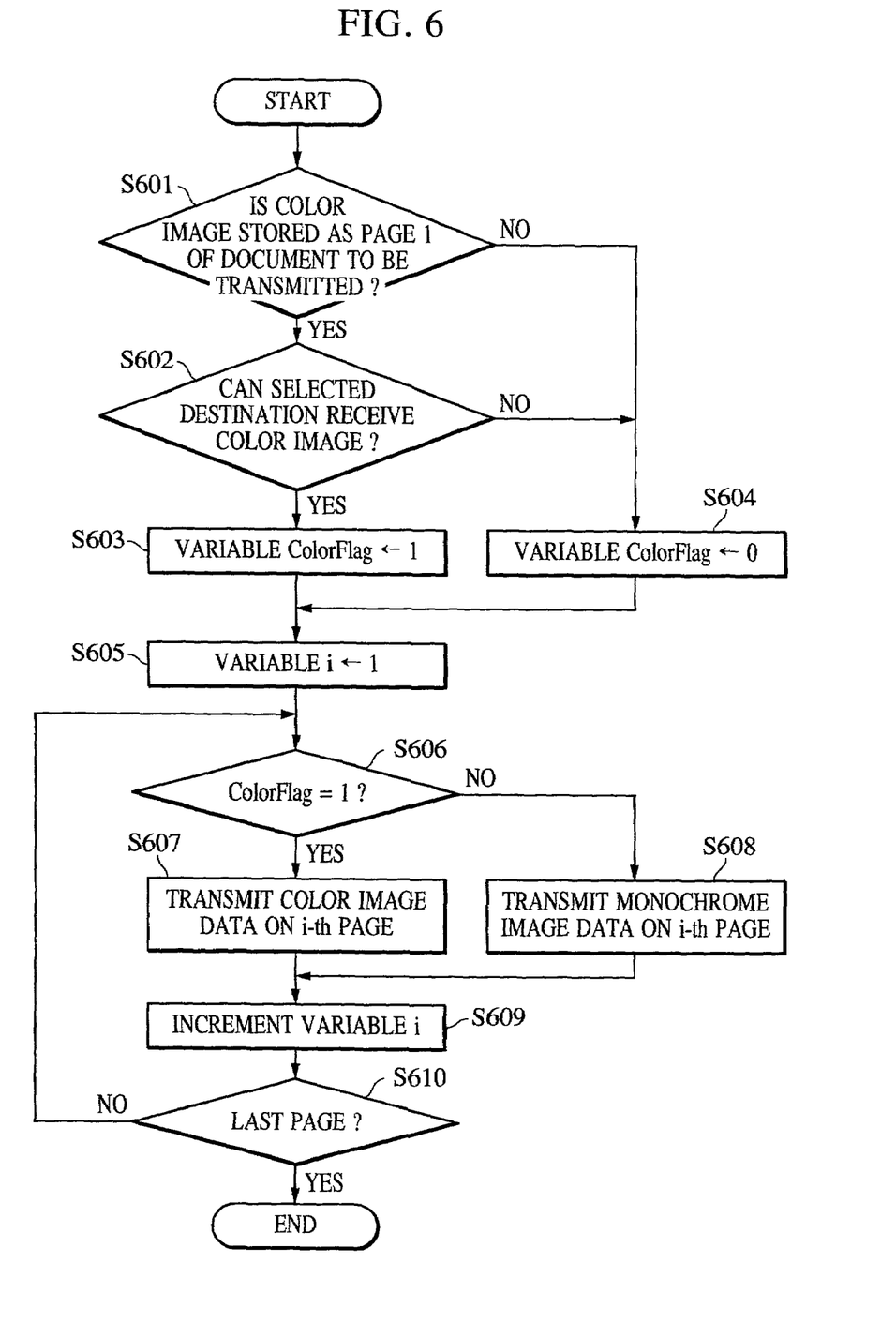
FIG. 6 is a flowchart showing a process of transmitting a document file to each destination designated by the process shown in FIG. 5.

FIGS. 4 to 6 are flowcharts showing the operation of the image scanner 100 shown in FIG. 1. The operation shown in FIGS. 4 to 6 is controlled by the CPU 105 based on the program stored in the program memory 106.

FIG. 4 shows a process of scanning a document and storing the scanned document in a designated storage box on the image storage screen shown in FIG. 2. The process starts when the user presses the scanning/storing start button 204 on the image storage screen shown in FIG. 2.

In step S401, a document file is created in a storage box designated by using the image storage screen shown in FIG. 2. At this stage, no image data is stored in the document file. In step S402, one is substituted for variable i in order to perform the subsequent process.

In step S403, the process determines whether a scanning mode designated in the scanning setting field 203 on the image storage screen shown in FIG. 2 is color mode or monochrome mode. If the designated scanning mode is color mode, the process proceeds to step S404. If the designated scanning mode is monochrome mode, the process proceeds to step S406.

In step S404, the process scans the i-th page of a document group as a color image using the image scanning unit 108. In step S405, the process stores (registers) the scanned color image as an i-th page color image in the document file created in step S401.

In step S406, the process scans the i-th page of the document group as a monochrome image using the image scanning unit 108. In step S407, the process stores (registers) the scanned monochrome image as an i-th page monochrome image in the document file created in step S401.

As is clear from the above description, when the color mode is designated, the image scanner 100 of the first embodiment scans and stores a document both as a color image and as a monochrome image. When the monochrome mode is designated, the image scanner 100 scans and stores a document only as a monochrome image. In this way, after the document has been scanned, it is possible to select an appropriate image from among the stored color image and monochrome image in accordance with specifications of a destination apparatus and to transmit the selected image to the destination apparatus. A monochrome image to be stored can be generated by processing a scanned color image or by scanning a document as a monochrome image from the beginning.

In step S408, the process determines whether the document is the last page of the document group. If the document is the last page, the process is terminated. If the document is not the last page, in step S409, the process adds one to the value of variable i and returns to step S403.

According to the process shown in FIG. 4, when the color mode is designated in the scanning setting field 203 on the image storage screen shown in FIG. 2, color images and monochrome images of all pages of the document group are stored in the designated storage box. When the monochrome mode is designated, only monochrome images of all pages of the document group are stored in the designated storage box.

FIG. 5 shows a process of controlling transmission of a stored document file. The process starts when the user presses the transmission start button 306 on the document transmission screen shown in FIG. 3.

In step S501, one is substituted for variable i in order to perform the subsequent process. In step S502, the process instructs a transmission processing program (FIG. 6), which will be described hereinafter, to start transmitting a designated document file in a designated storage box on the document transmission screen shown in FIG. 3 to the i-th destination designated in the transmission destination field 303 (for example, the first destination "e-mail@mail.co.jp" in FIG. 3).

In step S503, the process determines whether the process has completed giving instructions to transmit the document file to all destinations designated in the transmission destination field 303. If the determination is affirmative, the process is terminated. If the determination is negative, the process adds one to the value of variable i in step S504 and returns to step S502.

FIG. 6 shows a process of transmitting a document file to each destination designated by the process shown in FIG. 5. The process starts every time the process shown in FIG. 5 gives an instruction to transmit the document file (in step S502).

In step S601, the process determines whether a color image (in addition to a monochrome image) is stored as the top page of the document file to be transmitted, which is designated in the in-box document reference field 302 on the document transmission screen shown in FIG. 3. If the determination is affirmative, the process proceeds to step S602. If the determination is negative, the process substitutes zero for variable ColorFlag in step S604.

In the first embodiment, when a color image (in addition to a monochrome image) is stored as the top page of the document file to be transmitted, color pages (in addition to monochrome images) of all pages are stored. If only a monochrome image is stored as the top page of the document file to be transmitted, only monochrome images of all pages are stored. In step S601, the process determines the scanning mode for the document file by referring to only the top page image.

In step S602, the process determines whether a destination apparatus designated by the process shown in FIG. 5 is capable of receiving color images. If the determination is affirmative, the process substitutes one for variable ColorFlag in step S603. If the determination is negative, the process substitutes zero for variable ColorFlag in step S604. When ColorFlag=1, a color image is to be transmitted to the destination using the subsequent process. When ColorFlag=0, a monochrome image is to be transmitted to the destination using the subsequent process.

In step S605, one is substituted for variable i in order to perform the subsequent process.

In step S606, the process determines whether variable ColorFlag is one. If the determination is affirmative, in step S607, the process uses the communication controller 109 to transmit the color image of the i-th page of the document file to be transmitted, which is designated in the in-box document reference field 302 in FIG. 3, to the destination apparatus designated by the process shown in FIG. 5. In contrast, when the process determines in step S606 that variable ColorFlag is not one, in step S608, the process uses the communication controller 109 to transmit a monochrome image of the i-th page of the document file to be transmitted, which is designated in the in-box document reference field 302 in FIG. 3, to the destination apparatus designated by the process shown in FIG. 5.

In step S609, the process adds one to variable i. In step S610, the process determines, based on the value of variable i, whether all pages of the document file to be transmitted have been transmitted to the destination apparatus designated by the process shown in FIG. 5. When the transmission is completed, the process is terminated (when the process shown in FIG. 5 has instructed the image scanner 100 to transmit the document file to another destination, the corresponding process shown in FIG. 6 starts). In contrast, when the transmission is not completed, the process returns to step S606 and transmits an image of the subsequent page to the destination apparatus.

As is clear from the above description, according to the image scanner 100 of the first embodiment, when the color mode scanning process (FIG. 4) is performed, a color image from among the stored color image and monochrome image is transmitted to an apparatus capable of receiving color images. The monochrome image from among the stored color image and monochrome image is transmitted to an apparatus which cannot receive color images.

Second Embodiment

According to an image scanner of a second embodiment of the present invention, when the color mode is designated, it is possible to separately determine whether each document forming a document group is a color document or a monochrome document. When the document is a color document, the document is scanned and stored as a color image and as a monochrome image. When the document is a monochrome document, the document is scanned and stored only as a monochrome image.

FIGS. 2, 3, and 5 also apply to the second embodiment of the present invention.

Figure 7:
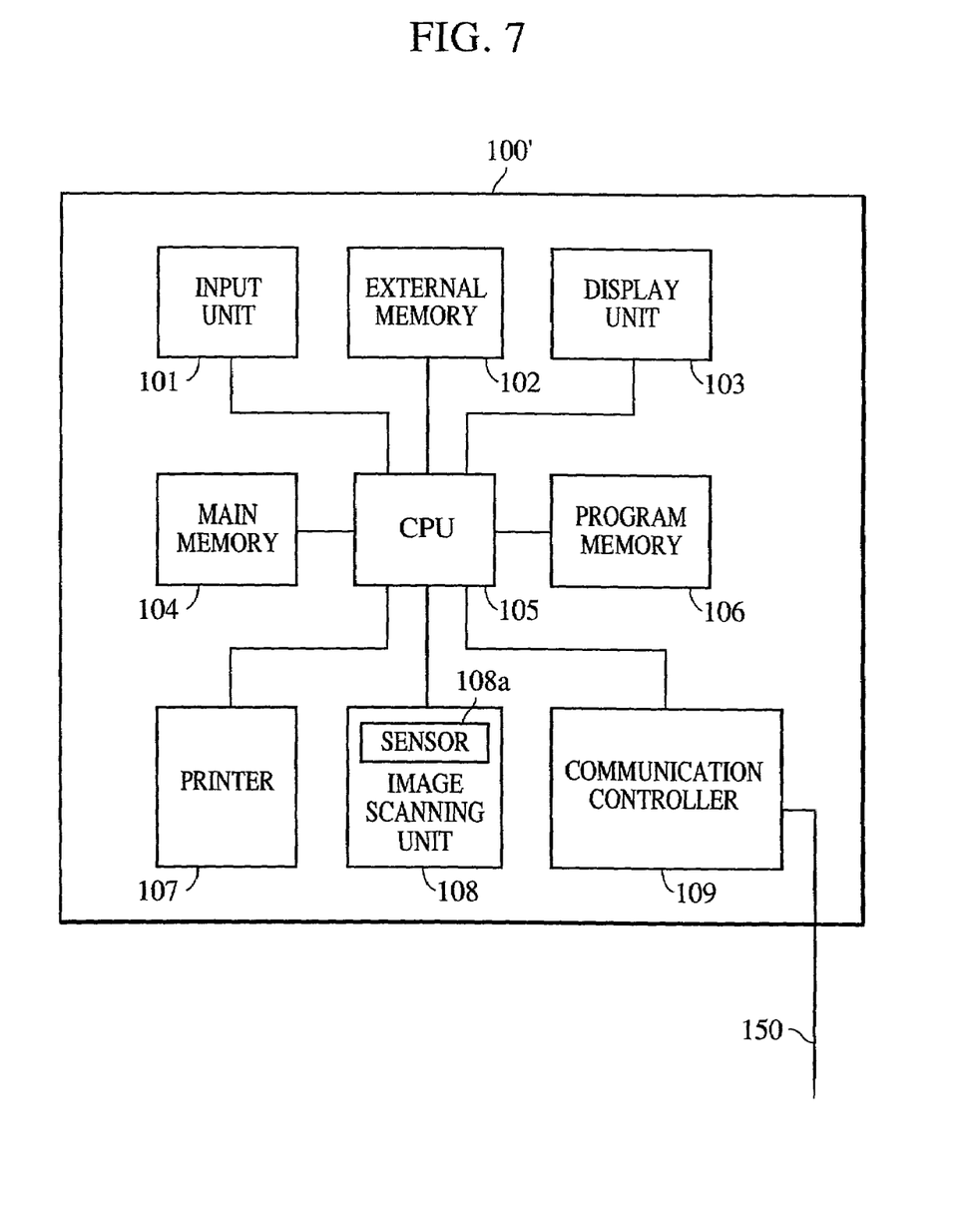
FIG. 7 is a block diagram of an image scanner according to a second embodiment of the present invention.

FIG. 7 shows the structure of the image scanner according to the second embodiment of the present invention. The same reference numerals are given to components corresponding to those in FIG. 1, and repeated descriptions of the common portions are omitted. An image scanner 100' of the second embodiment includes a sensor 108a for determining whether a document is a color document or a monochrome document. For example, the sensor 108a compares the magnitude of an R signal, a G signal, and a B signal which are output from an opto-electrical transducer, such as a CCD line sensor, for reading a document, and determines whether the document is a color document or a monochrome document. The sensor 108a can be formed of software, hardware, or a combination of the two. The sensor 108a can be incorporated in the image scanning unit 108 or in the CPU 105 (in this case, the sensor 108a is typically implemented by software). Alternatively, the sensor 108a can be provided as a component other than the image scanning unit 108 and the CPU 105.

Figure 8:
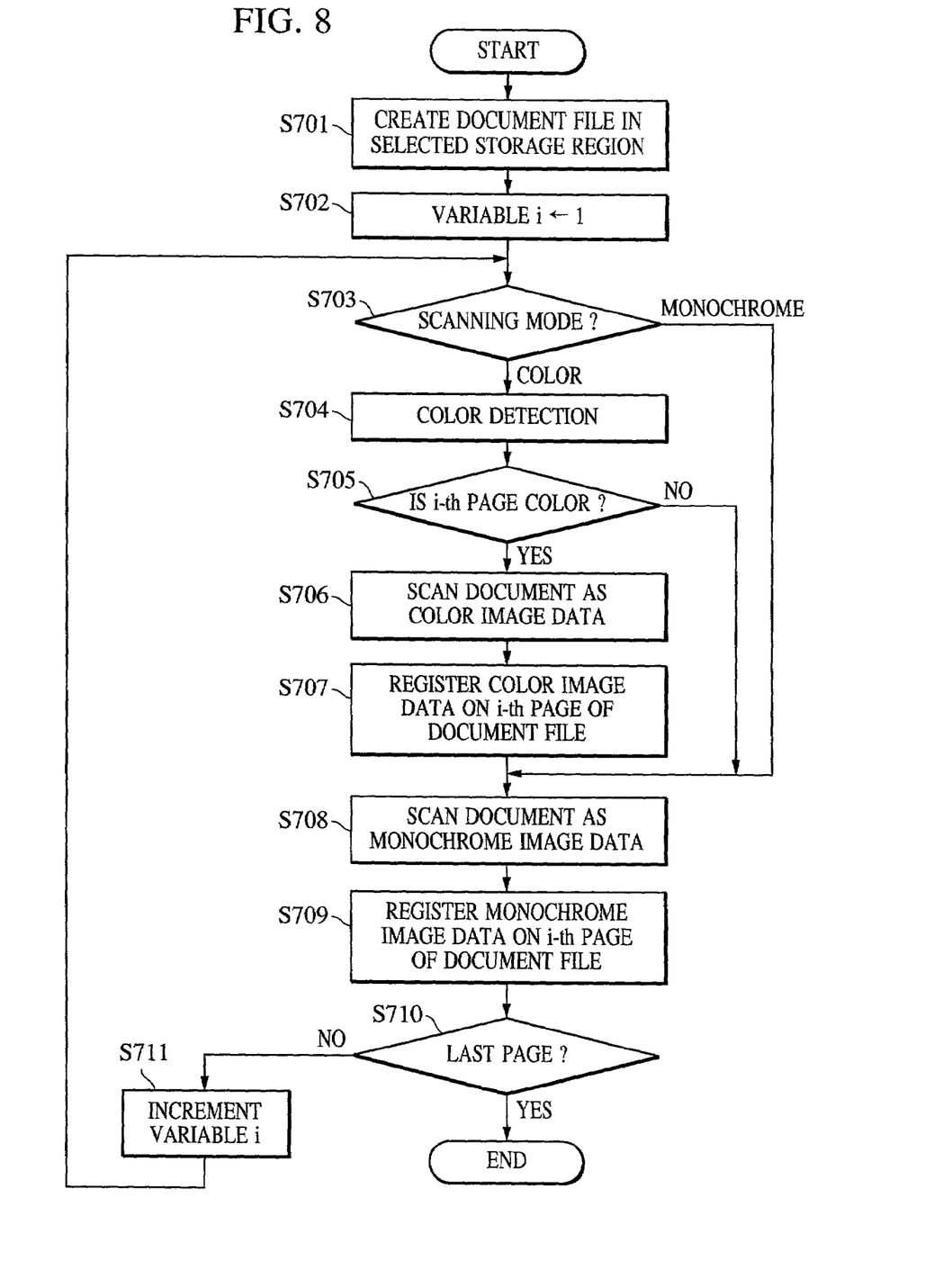
FIG. 8 is a flowchart showing a process of reading a document and storing the document in a storage box designated on the image storage screen shown in FIG. 2.
Figure 9:
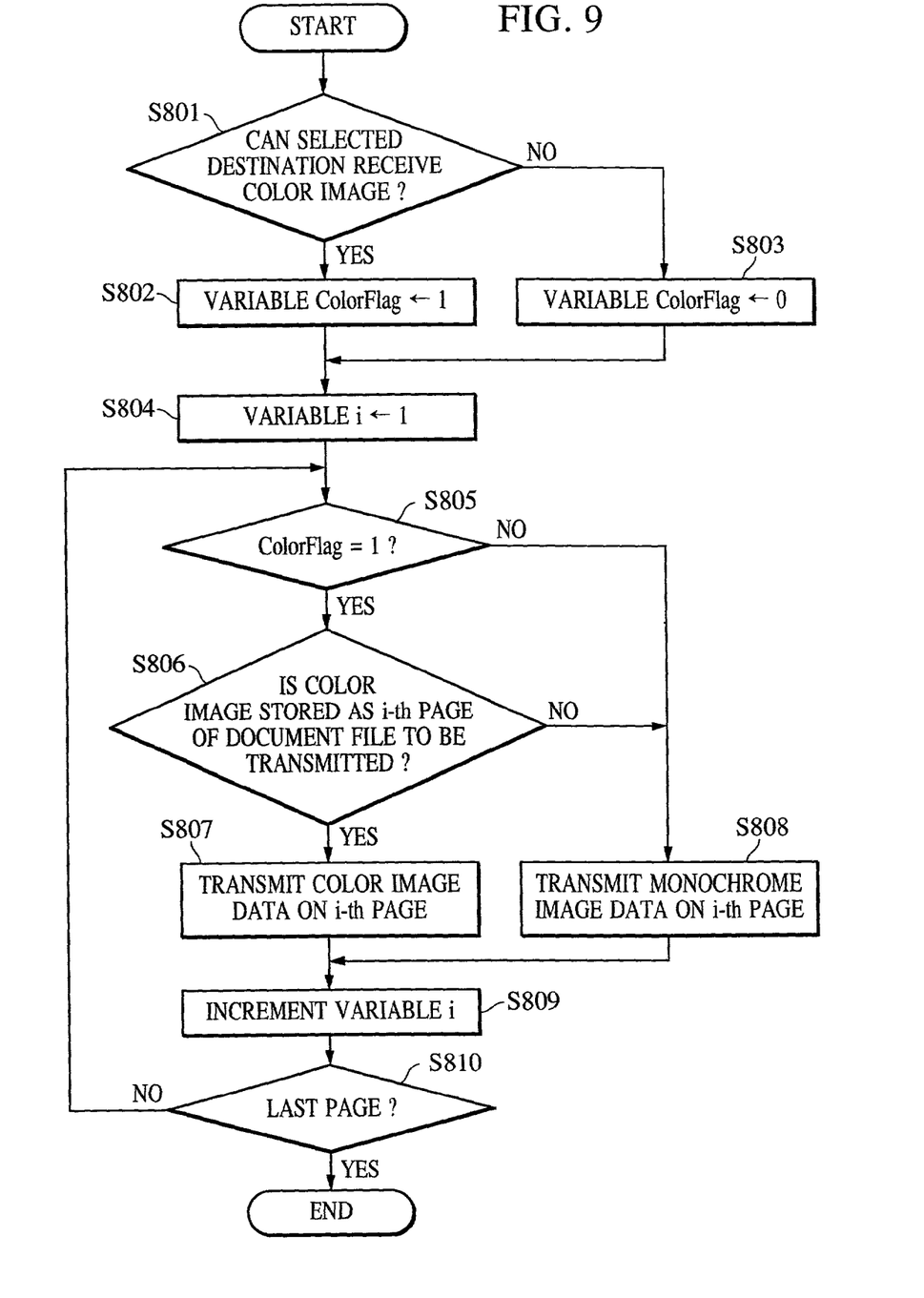
FIG. 9 is a flowchart showing a process of transmitting a document file to each destination designated by the process shown in FIG. 5.

FIGS. 5, 8, and 9 are flowcharts showing the operation of the image scanner 100' shown in FIG. 7. The operation shown in FIGS. 5, 8, and 9 is controlled by the CPU 105 in accordance with the program stored in the program memory 106.

FIG. 8 shows a process of scanning a document and storing the scanned document in a designated storage box on the image storage screen shown in FIG. 2. The process starts when the user presses the scanning start button 204 on the image storage screen shown in FIG. 2.

In step S701, the process creates a document file in a storage box designated using the image storage screen shown in FIG. 2. At this stage, no image data is stored in the document file. In step S702, one is substituted for variable i in order to perform the subsequent process.

In step S703, the process determines whether a scanning mode designated in the scanning setting field 203 on the image storage screen shown in FIG. 2 is color mode or monochrome mode. If the designated scanning mode is the color mode, the process proceeds to step S704. If the designated scanning mode is the monochrome mode, the process proceeds to step S708.

In step S704, the process detects whether the document to be scanned is a color document or a monochrome document by using the sensor 108a. In step S705, when it is determined based on the detection result that the document to be scanned is a color document, the process proceeds to step S706. When the document to be transmitted is a monochrome document, the process proceeds to step S708.

In step S706, the process scans the i-th page of a document group as a color image using the image scanning unit 108. In step S707, the process stores (registers) the scanned color image as an i-th page color image in the document file created in step S701.

In step S708, the process scans the i-th page of the document group as a monochrome image by the image scanning unit 108. In step S709, the process stores (registers) the scanned monochrome image as an i-th page monochrome image in the document file created in step S401.

As is clear from the above description, when the color mode is designated and when a document to be transmitted is a color document, the image scanner 100' of the second embodiment scans and stores the document both as a color image and as a monochrome image. When a document to be transmitted is a monochrome document or when the monochrome mode is designated, the image scanner 100' scans and stores the document only as a monochrome image. In this way, after the document has been scanned, it is possible to select an appropriate image from among the stored color image and monochrome image in accordance with specifications of a destination apparatus and to transmit the selected image to the destination apparatus.

According to the second embodiment, even when the color mode is designated, when a document to be transmitted is a monochrome document, the document is stored only as a monochrome image. Thus, the efficiency of scanning is improved as compared with the first embodiment.

In step S710, the process determines whether the document is the last page of the document group. If the document is the last page, the process is terminated. If the document is not the last page, in step S711, the process adds one to variable i and returns to step S703.

According to the process shown in FIG. 8, when the color mode is designated in the scanning setting field 203 on the image storage screen shown in FIG. 2, concerning each color page of the document group to be transmitted, both a color image and a monochrome image are stored in the designated storage box. Concerning each monochrome image of the document group to be transmitted, only a monochrome image is stored in the designated storage box. When the monochrome mode is designated in the scanning setting field 203 on the image storage screen shown in FIG. 2, only monochrome images of all pages of the document group are stored in the designated storage box.

FIG. 5 shows a process of controlling transmission of a stored document file. The process starts when the user presses the transmission start button 306 on the document transmission screen shown in FIG. 3.

In step S501, one is substituted for variable i in order to perform the subsequent process. In step S502, the process instructs a transmission processing program (FIG. 9), which will be described hereinafter, to start transmitting a designated document file in a storage box designated on the document transmission screen shown in FIG. 3 to the i-th destination designated in the transmission destination field 303 (for example, the first destination "e-mail@mail.co.jp" in FIG. 3).

In step S503, the process determines whether the process has completed giving instructions to transmit the document file to all destinations designated in the transmission destination field 303. If the determination is affirmative, the process is terminated. If the determination is negative, the process adds one to variable i in step S504 and returns to step S502.

FIG. 9 is a flowchart showing a process of transmitting a document file to each destination designated by the process shown in FIG. 5. The process starts every time the process shown in FIG. 5 gives an instruction to transmit the document file (in step S502).

In step S801, the process determines whether a destination apparatus designated by the process shown in FIG. 5 is capable of receiving color images. If the determination is affirmative, the process adds one for variable ColorFlag in step S802. If the determination is negative, the process adds zero for variable ColorFlag in step S803. When ColorFlag=1, a color image is to be transmitted to the destination using the subsequent process. When ColorFlag=0, a monochrome image is to be transmitted to the destination using the subsequent process.

In step S805, the process determines whether variable ColorFlag is one. If the determination is affirmative, the process proceeds to step S806. If the determination is negative, the process proceeds to step S808.

In step S806, the process determines whether a color image (in addition to a monochrome image) is stored as the i-th page of the document file to be transmitted, which is designated in the in-box document reference field 302 on the document transmission screen shown in FIG. 3. If a color image is stored, the process proceeds to step S807. If a color image is not stored, the process proceeds to step S808.

In step S807, the process uses the communication controller 109 to transmit a color image of the i-th page of the document file to be transmitted, which is designated in the in-box document reference field 302 in FIG. 3, to the destination apparatus designated by the process shown in FIG. 5.

In step S808, the process uses the communication controller 109 to transmit a monochrome image of the i-th page of the document file to be transmitted, which is designated in the in-box document reference field 302 in FIG. 3, to the destination apparatus designated by the process shown in FIG. 5.

In step S809, the process adds one to the value of variable i. In step S810, the process determines, based on the value of variable i, whether all pages of the document file to be transmitted have been transmitted to the destination apparatus designated by the process shown in FIG. 5. When the transmission is completed, the process is terminated (when the process shown in FIG. 5 has instructed the image scanner 100 to transmit the document file to another destination, the corresponding process shown in FIG. 9 starts). In contrast, when the transmission is not completed, the process returns to step S805 and transmits an image of the subsequent page to the destination apparatus.

As is clear from the above description, when a color image is stored as the scanned image, the image scanner 100' of the second embodiment transmits the color image to an apparatus capable of receiving color images. When only a monochrome image is stored as the scanned image, the monochrome image is transmitted. The image scanner 100' transmits only the monochrome image (as between the stored color image and monochrome image) to an apparatus that cannot receive color images.

OTHERS

Although the above embodiments only use the color image mode and the monochrome image (an example of a black-and-white image) mode, the present invention is not limited to these embodiments. Alternatively, the present invention can use images in other formats, such as (a) a gray-scale image (an example of a black-and-white image) and a color image, (b) a first-resolution image and a second-resolution image, (c) a first gray-level image and a second gray-level image, and (d) an image in a first compression format and an image in a second image format.

The present invention can be applied to an apparatus formed of a plurality of separate units, and to a single apparatus.

The objects of the present invention can be achieved by supplying a storage medium (or recording medium) on which software program code is recorded for implementing the functions of the embodiments to a system or an apparatus, so that a computer (CPU or MPU) of the system or the apparatus reads and executes the program code stored in the storage medium. In this case, the program code itself read from the storage medium implements the functions of the embodiments, and the recording medium on which the program code is recorded forms the present invention. When the computer executes the read program code, the functions of the embodiments are implemented. Alternatively, based on instructions of the program code, an operating system (OS) running on the computer can perform part of or the entirety of the actual processing, thereby implementing the functions of the embodiments.

The program code read from the storage medium can be written in a memory provided in an add-on card inserted into the computer or an add-on unit connected to the computer. Subsequently, based on instructions of the program code, a CPU or the like provided in the add-on card or the add-on unit performs part of or the entirety of the actual processing, thereby implementing the functions of the embodiments.

Accordingly, it is possible to efficiently transmit a scanned image to various apparatuses.

The implementation of all of the elements and steps described above is within the ordinary level of skill in the relevant technical field, using components and techniques that are commercially available and/or well known to those in the art.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for enabling manual designation of a plurality of image-data storage destinations for image data that can be read in a plurality of reading modes prior to transmission of image data from the storage destination comprising:

an image reading unit adapted to read a document image in a plurality of reading modes and to generate color image data of the document image and monochrome image data of the document image;

a manually controlled input unit that designates a plurality of storage destinations in a memory of image data corresponding to the document image read by said image reading unit in response to an instruction by a user, said input unit comprising a display:

configured to display a plurality of storage destinations in a memory into one of which color image data of the document image and monochrome image data of the document image will be stored in response to an instruction by the user designating one of the displayed storage destinations; and configured to display a plurality of reading modes including a color reading mode and a monochrome reading mode in one of which the document image will be read by said image reading unit in response to an instruction by the user designating one of the displayed reading modes, a file creating unit adapted to create a file in the memory at the manually designated destination into which the image data corresponding to the document image will be stored, and from which the image data will be transmitted in response to an instruction by a user; and a controller adapted to register the document image which was read by said image reading unit both as the color image data and as the monochrome image data in the file which was created by said file creating unit at the manually designated destination after designating one of the reading modes displayed by said input unit.

2. An image processing apparatus according to claim 1, further comprising a transmission unit adapted to transmit image data to a destination apparatus, wherein said controller reads out one of the color image data and the monochrome image data stored in the file, which is suitable for the destination apparatus, and controls said transmission unit to transmit the read out image data to the destination apparatus.

3. An image processing apparatus according to claim 1, further comprising a determining unit adapted to determine whether a document is one of a color document and a monochrome document, wherein, when said determining unit determines that the document is a color document, said controller registers the document image both as the color image data and as the monochrome image data in the file, and when said determining unit determines that the document is a monochrome document, said controller registers the document image as the monochrome image data in the file.

4. An image processing apparatus according to claim 1, wherein said image reading unit continuously reads image data for a plurality of documents.

5. An image processing apparatus according to claim 1, wherein said manually controlled input unit comprises a touch panel comprising an image storage screen displaying a plurality of storage destinations in said memory at which the image data corresponding to the document image read by said image reading unit can be stored, and wherein one of the storage destinations in said memory is designated in response to the user touching a name or image identifying that storage destination displayed on said image storage screen of said touch panel.

6. The image processing apparatus according to claim 5, wherein said image storage screen displays:

a storage-box selection button group comprising a group of buttons each representing a different file at a different storage destination in said memory for the image data corresponding to the document image read by said image reading unit, wherein one of the files at one of the storage destinations in said memory is selected in response to the user touching of the buttons; and a destination field comprising the storage box or storage boxes selected by the user by the user touching one of the buttons in said storage-box selection button group.

7. The image processing apparatus according to claim 6, wherein said image storage screen also displays:

a scanning setting field permitting the user to designate a scanning mode, the scanning setting field comprising displayed data representing a color scanning mode and data representing a monochrome scanning mode, wherein the color scanning mode is designated in response to the user touching the displayed data representing the color scanning mode and the monochrome scanning mode is designated in response to the user touching the displayed data representing the monochrome scanning mode; and a scanning/storing start button, wherein said image reading unit starts reading the document image in the scanning mode selected by the user by the user touching one of the data representing the color scanning mode and the data representing the monochrome scanning mode, and then registers the document image which was read by said image reading unit in the file at the storage destination which was selected by the user touching one of the buttons.

8. An image transmitting apparatus for displaying names of or images representing a plurality of files at least one of which contains image data of a document image and for enabling the manual selection one of the plurality of files, whose name or image is displayed, for transmission, comprising:

a memory adapted to store each of the plurality of files including the at least one file containing the document image so that the document image is stored as image data in a plurality of formats, including a non-contact-requiring format that does not require contacting a destination apparatus to determine whether the format of the document image is suitable to the destination apparatus and contact-requiring format that requires contacting the destination apparatus to determine whether the format of the document image is suitable to the destination apparatus;

a display unit configured to display the plurality of names of or the plurality of images representing the plurality of files stored in said memory;

a file selection unit adapted for a user to select at least one of the plurality of files in said memory whose name or image is displayed on said display unit;

a controller:

adapted to read out the data from the file which was selected by a user through said file selection unit;

adapted to determine whether the format of the data from the user-selected file is a non-contact-requiring format or a contact-requiring format;

adapted to contact the destination apparatus to determine whether the format of the data from the user-selected file is suitable to the destination apparatus only when the format of the data from the user-selected file is the contact-requiring format, and adapted to refrain from contacting the destination apparatus to determine whether the format of the data from the user-selected file is suitable to the destination apparatus when the format of the data from the user-selected file is the non-contact-requiring format, wherein in the event the selected file is the file containing image data of the document image in the contact-requiring format, the controller reads out the image data of the document image in a format suitable for a destination apparatus after contacting the destination apparatus to determine whether the format of the user-selected file is suitable to the destination apparatus; and a transmitting unit adapted to transmit the data read out by said controller to the destination apparatus without contacting the destination apparatus to determine whether the format of the data to be transmitted is suitable to the destination apparatus when the format of the data to be transmitted is the non-contact-requiring format, and adapted to contact the destination apparatus to determine whether the format of the data read out by the controller is suitable to the destination apparatus before transmitting the read out data when the format of the read out data is the contact-requiring format.

9. An image transmitting apparatus according to claim 8, wherein said memory stores the document image both as color image data and monochrome image data in the file.

10. The image transmission apparatus according to claim 8, wherein said file selection unit comprises a touch panel comprising a document transmission screen comprising said display unit.

11. The image transmission apparatus according to claim 10, wherein said document transmission screen displays:
- a storage-box reference button group comprising a plurality of differently labeled storage buttons each representing a different one of the plurality of files, wherein each storage button is labeled with the name of one of the plurality of files, wherein one of the files is selected for transmission in response to the user touching one of the displayed buttons; and
- an in-box document reference field comprising one or more names of the one or more documents stored in the files represented by the plurality of buttons, wherein a document of a file is selected for transmission in response to the user touching the name of that document and touching the button of the file to which that document belongs.

12. The image transmission apparatus according to claim 11, wherein said document transmission screen also displays:
- a transmission destination input field into which the user inputs a transmission destination to which the image data from one of the document images will be transmitted in response to a selection of the user;
- a destination type selection button group comprising a plurality of buttons each representing a different type of transmission destination, wherein the input of the transmission destination is confirmed in response to the user touching one of the buttons of the destination type selection button group;
- a transmission destination field into which the input transmission destination is registered in response confirmation of the input destination by the user touching one of the buttons of the destination type selection button group; and
- a transmission start button, the pressing of which by the user starts transmission of the selected file and document.

13. A control method for an image processing apparatus for enabling manual designation of a plurality of image-data storage destinations in a memory of the image processing apparatus for image data that can be read in a plurality of reading modes prior to transmission of image data from the storage destination, the image processing apparatus comprising an image reading unit adapted to read a document image in a plurality of reading modes and to generate color image data of the document image and monochrome image data of the document image, said method comprising the steps of:
- displaying the plurality of storage destinations in the memory into one of which color image data of the document image and monochrome image data of the document image will be stored in response to an instruction by the user designating the one of the displayed storage destinations and displaying the plurality of reading modes including a color reading mode and a monochrome reading mode in one of which the document image will be read by the image reading unit in response to designating the one of the displayed reading modes;
- designating one of the plurality of displayed storage destinations in the memory of the image processing apparatus of image data corresponding to the document image read by the image reading unit in response to an instruction by a user and designating one of the plurality of reading modes in one of which the document image will be read by the image reading unit;
- creating a file, selected by a user, in the memory at the manually designated storage destination into which image data corresponding to the document image will be stored, and from which image data will be transmitted; and
- registering the document image which is read by the image reading unit both as the color image data and as the monochrome image data in the file at the manually designated destination after designating one of the reading modes in said designating step.

14. A control method according to claim 13, wherein said designating step designates the storage destination in said memory of the image data corresponding to the document image read by the image reading unit in response to the user touching the name or image identifying that storage destination displayed on an image storage screen of a touch panel.

15. A control method according to claim 14, further comprising the step of displaying on the image storage screen:
- a storage-box selection button group comprising a group of buttons each representing a different file at a different storage destination in the memory for the image data corresponding to the document image read by the image reading unit, wherein one of the files at one of the storage destinations in the memory is selected in response to the user touching of the buttons; and
- a destination field comprising the storage box or storage boxes selected by the user by the user touching one of the buttons in the storage-box selection button group.

16. A control method according to claim 15, further comprising the step of also displaying on the image storage screen:
- a scanning setting field permitting the user to designate a scanning mode, the scanning setting field comprising displayed data representing a color scanning mode and data representing a monochrome scanning mode, wherein the color scanning mode is designated in response to the user touching the displayed data representing the color scanning mode and the monochrome scanning mode is designated in response to the user touching the displayed data representing the monochrome scanning mode; and
- a scanning/storing start button, wherein the image reading unit starts reading the document image in the scanning mode selected by the user by the user touching one of the data representing the color scanning mode and the data representing the monochrome scanning mode, and then registers the document image which was read by the image reading unit in the file at the storage destination which was selected by the user touching one of the buttons.

17. A control method for an image transmitting apparatus for displaying the names of or images representing a plurality of files at least one of which contains image data of a document image and for enabling the manual selection one of the plurality of files, whose name or image is displayed, for transmission, the image transmitting apparatus comprising a memory adapted to store each of the plurality of files including the at least one file containing the document image so that the document image is stored as image data in a plurality of formats, including a non-contact-requiring format that does not require contacting a destination apparatus to determine whether the format of the document image is suitable to the destination apparatus and contact-requiring format that requires contacting the destination apparatus to determine whether the format of the document image is suitable to the destination apparatus, said method comprising the steps of:

displaying the plurality of names of or the plurality of images representing the plurality of files stored in the memory;

selecting at least one of the plurality of files in the memory whose name or image is displayed in said displaying step in response to the user manually designating the at least one of the files whose name or image is displayed in said displaying step;

determining whether the format of the data from the user-selected file is a non-contact-requiring format or a contact-requiring format;

contacting the destination apparatus to determine whether the format of the data from the user-selected file is suitable to the destination apparatus when the format of the data from the user-selected file is the contact-requiring format, and refraining from contacting the destination apparatus to determine whether the format of the data from the user-selected file is suitable to the destination apparatus when the format of the data from the user-selected file is the non-contact-requiring format, reading out from the file, when selected by a user, the data stored therein, wherein in the event the selected file is the file containing image data of the document image in the contact-requiring format, said reading out step reads out the image data of the document image in a format suitable for the destination apparatus after contacting the destination apparatus in said contacting step to determine whether the format of the user-selected file is suitable to the destination apparatus; and transmitting the read out data to the destination apparatus without contacting the destination apparatus to determine whether the format of the data to be transmitted is suitable to the destination apparatus when the format of the data to be transmitted is the non-contact-requiring format, and transmitting the read out data to the destination apparatus after contacting the destination apparatus to determine whether the format of the data read out by the controller is suitable to the destination apparatus when the format of the read out data is the contact-requiring format.

18. A control method according to claim 17, wherein said file selection step selects one of the plurality of files in response to the user touching one of the names or images representing the plurality of files stored in the memory displayed in said displaying step on a touch panel comprising a document transmission screen on which the plurality of names or images representing the plurality of files stored in the memory are displayed.

19. A control method according to claim 18, wherein said displaying step further comprises the steps of displaying on the document transmission screen:

a storage-box reference button group comprising a plurality of differently labeled storage buttons each representing a different one of the plurality of files, wherein each storage button is labeled with the name of one of the plurality of files, wherein one of the files is selected for transmission in response to the user touching one of the displayed buttons; and an in-box document reference field comprising one or more names of the one or more documents stored in the files represented by the plurality of buttons, wherein a document of a file is selected for transmission in response to the user touching the name of that document and touching the button of the file to which that document belongs.

20. A control method according to claim 19, wherein said displaying step further comprises the step of also displaying on the document transmission screen:

a transmission destination input field into which the user inputs a transmission destination to which the image data from one of the document images will be transmitted in response to a selection of the user;

a destination type selection button group comprising a plurality of buttons each representing a different type of transmission destination, wherein the input of the transmission destination is confirmed in response to the user touching one of the buttons of the destination type selection button group;

a transmission destination field into which the input transmission destination is registered in response confirmation of the input destination by the user touching one of the buttons of the destination type selection button group; and a transmission start button, the pressing of which by the user starts transmission of the selected file and document.

21. A computer program stored on a computer readable medium for controlling an image processing apparatus for enabling manual designation of a plurality of image-data storage destinations in a memory of the image processing apparatus for image data that can be read in a plurality of reading modes prior to transmission of image data from the storage destination, the image processing apparatus comprising an image reading unit adapted to read a document image in a plurality of reading modes and to generate color image data of the document image and monochrome image data of the document image, said program comprising:

code for displaying the plurality of storage destinations in the memory into one of which color image data of the document image and monochrome image data of the document image will be stored in response to an instruction by the user designating one of the displayed storage destinations and for displaying the plurality of reading modes including a color reading mode and a monochrome reading mode in one of which the document image will be read by the image reading unit in response to designating one of the displayed reading modes;

code for designating one of the plurality of displayed storage destinations in the memory of the image processing apparatus of image data corresponding to the document image read by the image reading unit in response to an instruction by the user and for designating one of the plurality of reading modes in one of which the document image will be read by the image reading uni in response to an instruction of the user;

code for creating a file in the memory at the manually designated destination into which image data corresponding to the document image is stored and from which the image data is transmitted in response to a file selection by a user; and code for registering the document image which is read by said image reading unit both as the color image data and as the monochrome image data in the file at the manually designated destination after designating one of the reading modes.

22. A computer program according to claim 21, wherein said designating code designates the storage destination in the memory of the image data corresponding to the document image read by the image reading unit in response to the user touching the name or image identifying that storage destination displayed on an image storage screen of a touch panel.

23. A computer program according to claim 22, further comprising code for displaying on the image storage screen:
   a storage-box selection button group comprising a group of buttons each representing a different file at a different storage destination in the memory for the image data corresponding to the document image read by the image reading unit, wherein one of the files at one of the storage destinations in the memory is selected in response to the user touching of the buttons; and
   a destination field comprising the storage box or storage boxes selected by the user by the user touching one of the buttons in the storage-box selection button group.

24. A computer program according to claim 23, further comprising code for also displaying on the image storage screen:
   a scanning setting field permitting the user to designate a scanning mode, the scanning setting field comprising displayed data representing a color scanning mode and data representing a monochrome scanning mode, wherein the color scanning mode is designated in response to the user touching the displayed data representing the color scanning mode and the monochrome scanning mode is designated in response to the user touching the displayed data representing the monochrome scanning mode; and
   a scanning/storing start button, wherein the image reading unit starts reading the document image in the scanning mode selected by the user by the user touching one of the data representing the color scanning mode and the data representing the monochrome scanning mode, and then registers the document image which was read by the image reading unit in the file at the storage destination which was selected by the user touching one of the buttons.

25. A computer program stored on a computer readable medium for controlling an image transmitting apparatus for displaying the names of or images representing a plurality of files at least one of which contains image data of a document image and for enabling the manual selection one of the plurality of files, whose name or image is displayed, for transmission, the image transmitting apparatus comprising a memory adapted to store each of the plurality of files including the at least one file containing the document image so that the document image is stored as image data in a plurality of formats, including a non-contact-requiring format that does not require contacting a destination apparatus to determine whether the format of the document image is suitable to the destination apparatus and contact-requiring format that requires contacting the destination apparatus to determine whether the format of the document image is suitable to the destination apparatus, said program comprising:
   code for displaying the plurality of names of or the plurality of images representing the plurality of files stored in the memory;
   code for selecting at least one of the plurality of files in the memory whose name or image is displayed in said displaying step in response to the user manually designating one of the files whose name or image is displayed in said displaying step;
   code for determining whether the format of the data from the user-selected file is a non-contact-requiring format or a contact-requiring format;
   code for contacting the destination apparatus to determine whether the format of the data from the user-selected file is suitable to the destination apparatus when the format of the data from the user-selected file is the contact-requiring format, and refraining from contacting the destination apparatus to determine whether the format of the data from the user-selected file is suitable to the destination apparatus when the format of the data from the user-selected file is the non-contact-requiring format,
   code for reading out, from the file when selected by a user, the data stored therein, wherein in the event the selected file is the file containing image data of the document image in the contact-requiring format, said reading out step reads out the image data of the document image in a format suitable for the destination apparatus after contacting the destination apparatus to determine whether the format of the user-selected file is suitable to the destination apparatus; and
   code for transmitting the read out data to the destination apparatus without contacting the destination apparatus to determine whether the format of the data to be transmitted is suitable to the destination apparatus when the format of the data to be transmitted is the non-contact-requiring format, and transmitting the read out data to the destination apparatus after contacting the destination apparatus to determine whether the format of the data read out by the controller is suitable to the destination apparatus when the format of the read out data is the contact-requiring format.

26. A computer program according to claim 25, wherein said file selection code selects one of the plurality of files in response to the user touching one of the names or images representing the plurality of files stored in the memory displayed by said displaying code on a touch panel comprising a document transmission screen on which the plurality of names or images representing the plurality of files stored in the memory are displayed.

27. A computer program according to claim 26, wherein said displaying code further comprises code for displaying on the document transmission screen:
   a storage-box reference button group comprising a plurality of differently labeled storage buttons each representing a different one of the plurality of files, wherein each storage button is labeled with the name of one of the plurality of files, wherein one of the files is selected for transmission in response to the user touching one of the displayed buttons; and
   an in-box document reference field comprising one or more names of the one or more documents stored in the files represented by the plurality of buttons, wherein a document of a file is selected for transmission in response to the user touching the name of that document and touching the button of the file to which that document belongs.

28. A computer program according to claim 27, wherein said displaying code further comprises code for also displaying on the document transmission screen:

a transmission destination input field into which the user inputs a transmission destination to which the image data from one of the document images will be transmitted in response to a selection of the user;

a destination type selection button group comprising a plurality of buttons each representing a different type of transmission destination, wherein the input of the transmission destination is confirmed in response to the user touching one of the buttons of the destination type selection button group;

a transmission destination field into which the input transmission destination is registered in response confirmation of the input destination by the user touching one of the buttons of the destination type selection button group; and a transmission start button, the pressing of which by the user starts transmission of the selected file and document.

* * * * *